United States Patent
Nonomura et al.

Patent Number: 6,115,021
Date of Patent: *Sep. 5, 2000

[54] METHOD AND APPARATUS FOR DRIVING A LIQUID CRYSTAL PANEL USING A FERROELECTRIC LIQUID CRYSTAL MATERIAL HAVING A NEGATIVE DIELECTRIC ANISOTROPY

[75] Inventors: Keisaku Nonomura, Nara; Takaji Numao; Hirofumi Katsuse, both of Kashiwa, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/497,692

[22] Filed: Jun. 30, 1995

[30] Foreign Application Priority Data

| Jul. 4, 1994 | [JP] | Japan | 6-152483 |
| Jul. 4, 1994 | [JP] | Japan | 6-152484 |

[51] Int. Cl.[7] .................................................. G09G 3/36
[52] U.S. Cl. ............................................. 345/101; 345/97
[58] Field of Search ................................. 345/87, 92, 97, 345/101, 95, 94, 89; 349/72

[56] References Cited

U.S. PATENT DOCUMENTS

| 4,902,107 | 2/1990 | Tsuboyama et al. | 345/101 |
| 5,033,822 | 7/1991 | Ooki et al. | 345/101 |
| 5,602,562 | 2/1997 | Onitsuka et al. | 345/101 |

FOREIGN PATENT DOCUMENTS

| 0 425 210 A2 | 5/1991 | European Pat. Off. . |
| 0 478 381 A2 | 4/1992 | European Pat. Off. . |
| 0519743A2 | 6/1992 | European Pat. Off. . |
| 61-250618 | 11/1986 | Japan . |
| 64-24234 | 1/1989 | Japan . |
| 2207272 | 1/1989 | United Kingdom ............. 345/101 |
| WO 92/02925 | 2/1992 | WIPO . |

OTHER PUBLICATIONS

P.W.H. Surguy et al. "The "JOERS/Alvey" Ferroelectric Multiplexing Scheme", *Ferroelectrics*, vol. 122, pp. 63–79, 1991.

*Primary Examiner*—Chanh Nguyen
*Attorney, Agent, or Firm*—David G. Conlin; George W. Neuner; Dike, Bronstein, Roberts & Cushman, LLP

[57] ABSTRACT

A ferroelectric liquid crystal panel including a plurality of scanning electrodes, a plurality of signal electrodes crossing the scanning electrodes, a ferroelectric liquid crystal material having two stable orientation states corresponding to different memory angles and provided at intersections of the plurality of scanning electrodes and the plurality of signal electrodes to form a plurality of pixels is driven. The plurality of pixels each have a first threshold characteristic regarding a voltage for switching a display state of the pixel into a non-display state and a second threshold characteristic regarding a voltage for switching the non-display state of the pixel into the display state. An apparatus for driving the ferroelectric liquid crystal panel includes a temperature sensor detecting an operation temperature of the ferroelectric liquid crystal panel; and signal output for outputting a driving signal based on a field frequency fixed at a prescribed reference frequency and a frame frequency determined in correspondence with the operation temperature of the ferroelectric liquid crystal panel detected by the temperature sensor, and writing the driving signal into each of the plurality of pixels at a writing time corresponding to a response time of each of the plurality of pixels changing in accordance with the operation temperature.

6 Claims, 16 Drawing Sheets

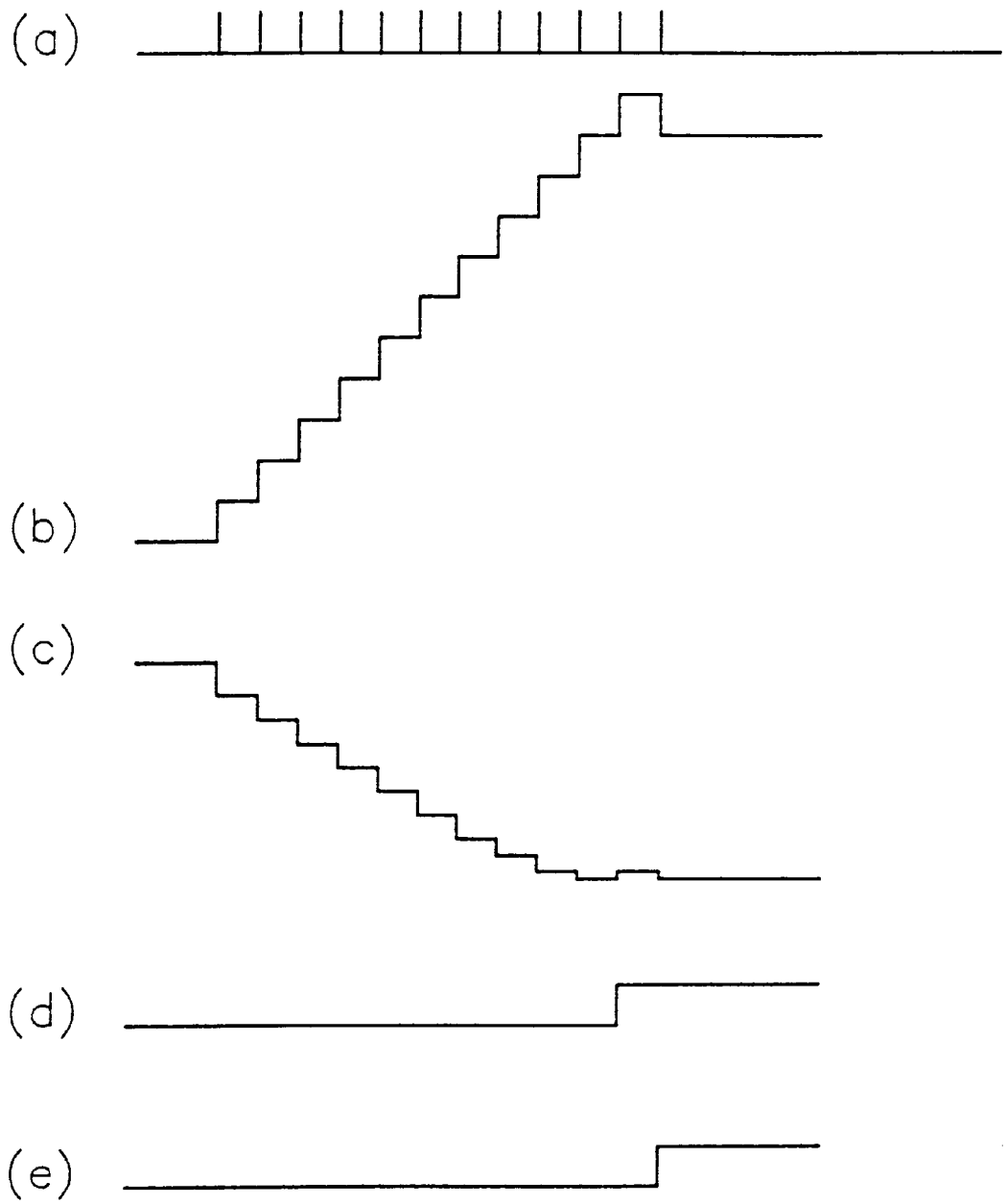

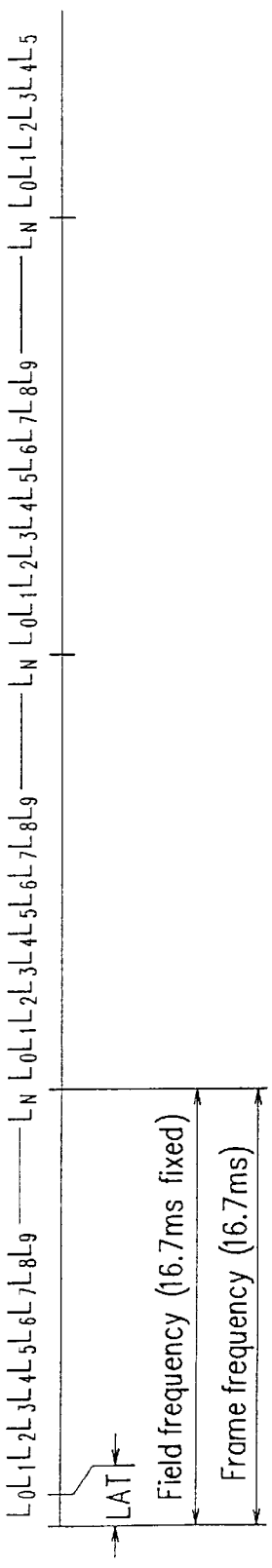
FIG.16A  Ratio of interlace : 1/1
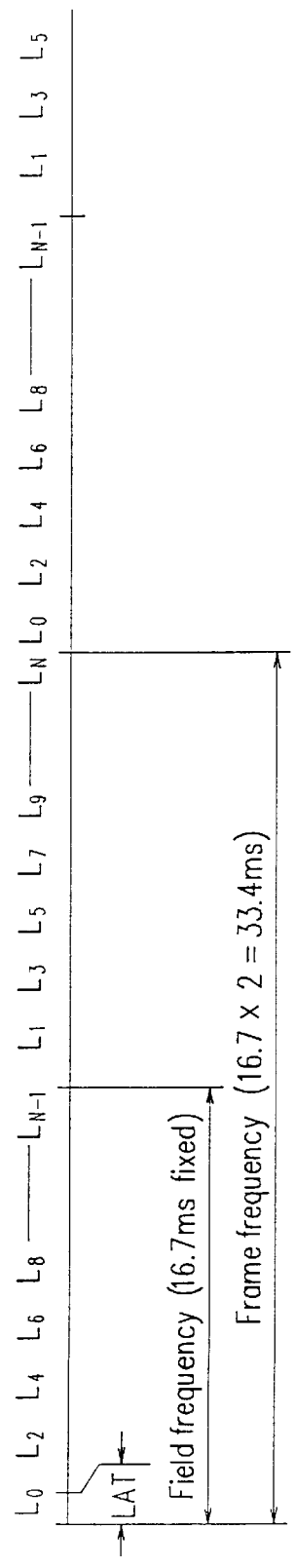
FIG.16B  Ratio of interlace : 1/2
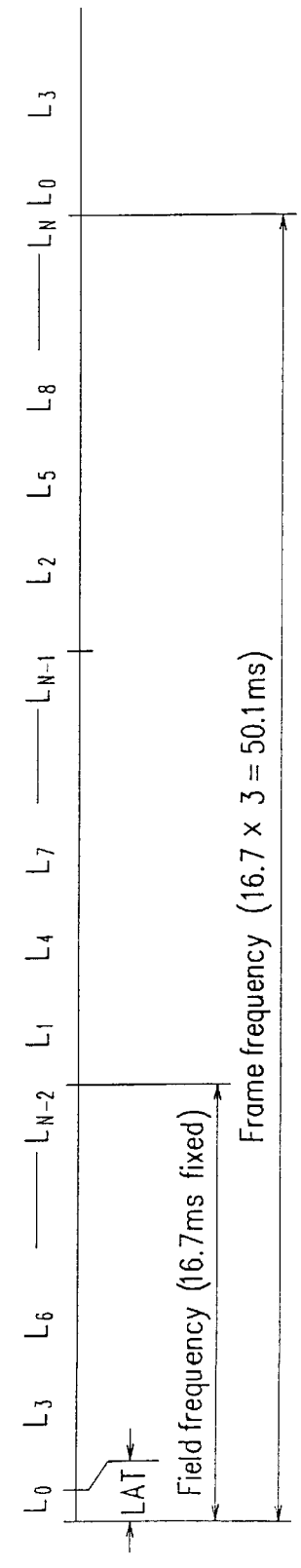
FIG.16C  Ratio of interlace : 1/3

METHOD AND APPARATUS FOR DRIVING A LIQUID CRYSTAL PANEL USING A FERROELECTRIC LIQUID CRYSTAL MATERIAL HAVING A NEGATIVE DIELECTRIC ANISOTROPY

BACKGROUND OF THE INVENTION

1. Field of the Invention

The present invention relates to an apparatus and a method for driving a liquid crystal display device (hereinafter, referred to as an "LCD device"), and in particular to an apparatus and a method for driving a liquid crystal panel using a ferroelectric liquid crystal material (hereinafter, referred to as an "FLC material") having a negative dielectric anisotropy.

2. Description of the Related Art

FLC materials are today actively studied for use in an LCD apparatus having a large display capacity with high precision due to excellent characteristics such as memory capability, high-speed response and a wide viewing angle.

FIG. 2 is a cross sectional view illustrating a basic structure of an FLC panel 1. Such a basic structure is common to FLC panels used in the present invention.

As is shown in FIG. 2, the FLC panel 1 includes two glass substrates 2a and 2b opposed to each other. On a surface of the substrate 2a, a plurality of signal electrodes S formed of a transparent material such as indium tin oxide (hereinafter, referred to as "ITO") are provided parallel to each other. An insulation film 3a formed of $SiO_2$ or the like is provided on the substrate 2a so as to cover the signal electrodes S. On a surface of the other substrate 2b, a plurality of transparent scanning electrodes L formed of ITO or the like are provided so as to be opposed to and perpendicular to the signal electrodes S. An insulation film 3b formed of $SiO_2$ is provided on the substrate 2b so as to cover the scanning electrodes L. Alignment films 4a and 4b are provided on the insulation films 3a and 3b, respectively. The alignment films 4a and 4b are formed of an organic polymer such as polyimide, nylon or polyvinyl alcohol or a film obtained by oblique evaporation of SiO, and are treated to align liquid crystal molecules in one direction.

The glass substrates 2a and 2b are assembled together with a sealing agent 5, and a gap between the insulation films 4a and 4b is filled with an FLC material 6 which is injected through an opening. The opening is sealed with the sealing agent 5 after the injection of the FLC material 6. The glass substrates 2a and 2b are interposed between a pair of polarizing plates 7a and 7b, which are arranged so that polarizing axes thereof be perpendicular to each other.

As is shown in FIG. 3B, an FLC molecule 10 has spontaneous polarization Ps in a direction perpendicular to the longer axis thereof. The FLC molecule 10 is supplied with a force which is in proportion to a vector product of an electric field E and the spontaneous polarization Ps, and thus moves on an upper part of a peripheral surface of a cone 11 having an apical angle which is twice a tilt angle θ. The electric field E is generated by a voltage applied to the signal electrodes S and a voltage applied to the scanning electrodes L.

At this point, the FLC molecule 10 is provided with a force F which is in proportion to a dielectric anisotropy Δε and a square of the electric field E. The dielectric anisotropy Δε is the difference between the dielectric constant in the direction of the longer axis and that in the direction of the shorter axis. The force F is represented by the following equation.

$$F = K_0 \times Ps \times E + K_1 \times \Delta\epsilon \times E^2$$

It is known that, in the case where the dielectric anisotropy (Δε) of the FLC material injected into the gap between the insulation films is negative, the force F applied to the FLC molecule 10 has a maximum at a certain level of the electric field. It is also known that, as is described in detail in Japanese Laid-Open Patent Publication No. 64-24234 and the like and is appreciated from FIG. 4 which shows the voltage vs. response time characteristic of the FLC material, the FLC material has a specific voltage (Vmin) at which the response time is minimum.

Methods for driving an FLC panel utilizing such a phenomenon are described in, for example, *The "Joers/Alvey" Ferroelectric Multiplexing Scheme,* (Ferroelectrics Vol. 122 (1991)), page 63 and International Patent Publication No. WO92/02925.

An FLC panel including an FLC material having a negative dielectric anisotropy driven by one of such methods has, for example, the following advantages over an FLC panel including an FLC material having a positive dielectric anisotropy:

(1) The displayed image has a higher contrast; and
(2) The alignment state of the FLC molecule 10 is stable in a wider temperature range, thus broadening the operation temperature.

Due to such advantages, the FLC panel including an FLC material having a negative dielectric anisotropy is effective for a display apparatus. While the response time is shortened in accordance with increase in the driving voltage in the FLC panel including an FLC material having a positive dielectric anisotropy, the FLC panel including an FLC material having a negative dielectric anisotropy has a specific voltage (Vmin) at which the response time is minimum. Such a specific voltage (Vmin) changes in accordance with the operation temperature or the like. Accordingly, for example, in the case where the operation temperature changes, the driving conditions need to be reset so that the FLC panel has such a specific voltage (Vmin).

FIG. 5 schematically shows a planar structure of a conventional simple matrix FLC display device (hereinafter, referred to as an "FLCD") 20 including the FLC panel 1.

The FLCD 20 operates in the following manner. A voltage is applied by a scanning electrode driving circuit 21 to each of a plurality of scanning electrodes Li (i=0 through 9 and A through F in FIG. 5), and a voltage is applied by a data electrode driving circuit 22 to each of a plurality of signal electrodes Sj (j=0 through 9 and A through F in FIG. 5). A driving voltage corresponding to a potential difference between one of the scanning electrodes Li and one of the corresponding signal electrode Sj is applied to a pixel Aij which is the intersection of the scanning electrode Li and the signal electrode Sj to turn "ON" or "OFF" the display. The data electrode driving circuit 22 includes a transfer circuit 23a for transferring data, a holding circuit 24a for holding the data for a certain time period in accordance with a latch pulse signal (LP), and a voltage generation circuit 25a for generating a voltage in accordance with the data.

The scanning electrode driving circuit 21 includes a transfer circuit 23b for transferring data, a holding circuit 24b for holding the data for a certain time period in accordance with the latch pulse signal (LP), and a voltage generation circuit 25b for generating a voltage in accordance with the data.

The FLC molecule 10 in a pixel Aij and the polarizing axes of the polarizing plates 7a and 7b have the following relationship. The FLC molecules 10 have two stable orientation states when aligned parallel to tilt axes 104 and 105 in FIG. 3A. The tilt axes 104 and 105 are symmetrical to each other with respect to a center line 103. In the case where the polarizing axis of one of the polarizing plates 7a and 7b is perpendicular to the tilt axes 104 or 105 and the polarizing axes of the polarizing plates 7a and 7b are perpendicular to each other (crossed nicols state), a pixel Aij in which the FLC molecules 10 are in one of the stable orientation states is in a dark display state, and a pixel Aij in which the FLC molecules 10 are in the other stable orientation state is in a bright display state.

In this specification, the polarizing axis of the polarizing plate 7a is perpendicular to the tilt axis 104. In this case, a pixel Aij in which the FLC molecules 10 are in the stable orientation state 104 (first stable orientation state) is in a dark display state, and a pixel Aij in which the FLC molecules 10 are in the stable orientation state 105 (second stable orientation state) is in a bright display state. The FLC molecule 10 is stable in the directions of tilt axes 104 and 105 having an angle of 2ω therebetween, not in the direction of tilt axes 106 and 107 having an angle of 2θ therebetween, because the FLC molecule 10 is tilted with respect to the substrates when being interposed by the substrates.

FIG. 6A shows a LAT (line address time, i.e., time required to scan one line) which is suitable for each operation temperature for driving an FLC panel by a method described in the specification of International Patent Publication No. WO92/02925 with reference to FIG. 5 in the above-mentioned publication. In this method, the Malvaren III waveforms are used. FIG. 6B shows a Malvaren III waveform of selection signal (writing signal) and a Malvaren III waveform of a non-selection signal (non-writing signal). FIGS. 14A and 14B show a LAT suitable for each operation temperature for driving an FLC panel used in a first example (infra) using the Malvaren III waveforms and the memory angle 2θ. Curves A and B in FIGS. 14A and 14B correspond to curves (A) and (B) in FIG. 6A.

Curve (A) in FIG. 6A shows how a maximum driving pulse width which is required to cause 100% inversion of the liquid crystal molecules changes in accordance with the temperature when the FLC panel is supplied with the selection signal shown in FIG. 6B. In an area on and above curve (A), display is inverted, namely, writing is performed. Curve (A) is also referred to as a switch minimum curve.

Curve (B) in FIG. 6A shows how a maximum driving pulse width by which the liquid crystal molecules are not inverted changes in accordance with the temperature when the FLC panel is supplied with the non-selection signal shown in FIG. 6B. In an area on and below curve (B), display is not inverted. Curve (B) is also referred to as a non-switch maximum curve.

Accordingly, the FLCD can be driven in an area between curves (A) and (B).

FIG. 6D shows an area in which such an FLC panel can be driven by a conventional method in which an image signal obtained at a fixed frame frequency such as a TV image signal is displayed at a fixed frame frequency. Demonstration display is possible at room temperature, but the LAT is excessively long at low temperature. Accordingly, the FLC panel cannot be driven for practical use, and thus the FLCD 20 cannot be used in TVs and the like.

FIG. 6C shows an ideal LAT for each operation temperature. Even if such a driving margin is obtained by future improvement, proper driving of an FLC panel for obtaining a TV image signal requires the LAT (approximately 50 ps or less in the case of the NTSC system) to be shorter than the LAT at the low temperature indicated by point (C).

Under current circumstances, such a high-speed response is obtained at room temperature but not at the lowest level of the operation temperature because the response time of the FLC material increases by 1.5 times each time the temperature lowers by 5° C.

Due to such problems, further improvement in the response time is needed in order to drive a HDTV (high definition TV) having 1000 or more scanning lines.

Memory angle is another characteristic of the FLC material. The memory angle significantly changes in accordance with the operation temperature and the writing time (namely, LAT). Even if the FLC panel is driven at a prescribed LAT corresponding to the temperature, it is impossible to drive the FLC panel while maintaining the memory angle in a wide temperature range (refer to FIGS. 14A and 14B).

Accordingly, the polarizing axis needs to be changed physically in order to keep the polarizing axis of the polarizing plate 7a (FIG. 2) perpendicular to the tilt axis 104 (FIG. 3A). However, in practice the polarizing plates 7a and 7b are pasted on the glass substrates 2a and 2b, and thus it is virtually impossible to move the polarizing axis.

SUMMARY OF THE INVENTION

In one aspect of the present invention, an apparatus drives a ferroelectric liquid crystal panel including a plurality of scanning electrodes, a plurality of signal electrodes crossing the scanning electrodes, a ferroelectric liquid crystal material having two stable orientation states corresponding to different memory angles and provided at intersections of the plurality of scanning electrodes and the plurality of signal electrodes to form a plurality of pixels, the plurality of pixels each having a first threshold characteristic regarding a voltage for switching a display state of the pixel into a non-display state and a second threshold characteristic regarding a voltage for switching the non-display state of the pixel into the display state. The apparatus includes a temperature detection device for detecting an operation temperature of the ferroelectric liquid crystal panel; and a signal output device for outputting a driving signal based on a field frequency fixed at a prescribed reference frequency and a frame frequency determined in correspondence with the operation temperature of the ferroelectric liquid crystal panel detected by the temperature detection device, and writing the driving signal into each of the plurality of pixels at a writing time corresponding to a response time of each of the plurality of pixels changing in accordance with the operation temperature.

In one embodiment of the invention, the frame frequency is determined by a ratio of interlace by which the ferroelectric liquid crystal panel is scanned.

In another aspect of the present invention, a method for driving the above-described ferroelectric liquid crystal panel includes the steps of detecting an operation temperature of the ferroelectric liquid crystal panel; and outputting a driving signal based on a field frequency fixed at a prescribed reference frequency and a frame frequency determined in correspondence with the operation temperature of the ferroelectric liquid crystal panel detected by the temperature detection device. The driving signal is written to each of the plurality of pixels at a writing time corresponding to a response time of each of the plurality of pixels changing in accordance with the operation temperature.

In one embodiment of the invention, the step of outputting the driving signal includes the step of determining the frame frequency by selecting the ratio of interlace in correspondence with the temperature while keeping the field frequency fixed, thus to obtain a prescribed time period for writing the driving signal for each of the plurality of pixels.

In still another aspect of the present invention, an apparatus for driving the above-described ferroelectric liquid crystal panel includes a driving voltage level determination device for determining such a driving voltage level as to maintain a memory angle at a constant value by compensating for a change in the memory angle in accordance with an operation temperature of the ferroelectric liquid crystal panel, based on the relationship between the driving voltage level and the memory angle of the ferroelectric liquid crystal panel; and a pixel driving device for outputting the driving voltage level determined by the driving voltage level determination device to each of the plurality of pixels.

In one embodiment of the invention, the driving voltage level determination device includes a temperature detection device for detecting the operation temperature of the ferroelectric liquid crystal panel.

In one embodiment of the invention, the driving voltage level determination device includes a temperature compensation driving voltage detection device provided in the ferroelectric liquid crystal panel for detecting a light transmittance of the ferroelectric liquid crystal panel which corresponds to a temperature compensation driving voltage applied to the ferroelectric liquid crystal panel.

In one aspect of the present invention, a method for driving the above-described ferroelectric liquid crystal panel includes the steps of determining such a driving voltage level as to maintain a memory angle at a constant value by compensating for a change in the memory angle in accordance with an operation temperature of the ferroelectric liquid crystal panel based on the relationship between the driving voltage level and the memory angle of the ferroelectric liquid crystal panel; and outputting the resulting driving voltage level to each of the plurality of pixels.

In one embodiment of the invention, the step of determining the driving voltage level includes the step of measuring the operation temperature of the ferroelectric liquid crystal panel.

In one embodiment of the invention, the step of detecting a light transmittance of the ferroelectric liquid crystal panel which corresponds to a temperature compensation driving voltage applied to the ferroelectric liquid crystal panel.

By a conventional method for driving an FLC panel at a constant scanning time in the operation temperature, the characteristics of an FLC panel to be driven needs to be restricted. According to the present invention, such an inconvenience is solved. In a driving apparatus and method according to the present invention, an image signal which is sent at a prescribed frame frequency and a prescribed field frequency is first stored in a memory frame. The field frequency is fixed at 60 Hz in order to prevent flicker even if the operation temperature changes. The frame frequency is changed step by step, for example, to 30 Hz and then to 20 Hz in accordance with the operation temperature by changing the ratio of interlace to 1/2 to 1/3, thus increasing the LAT by two and three times. The data is read from the frame memory in such a manner that a sufficiently long LAT can be obtained even at low temperature. As a result, display with a sufficiently high contrast is obtained. In this specification, the ratio of interlace is determined by the number of field included in each frame. For example, in the case of that the ratio of interlace is 1/1 or 1:1, one field and one frame have the same length; and in the case of that the ratio of interlace is 1/2 or 1:2, one frame is twice as long as one field.

In order to drive an FLC panel in the operation temperature thereof, the LAT is changed in accordance with the temperature. If the frame frequency is changed, the following two problems are expected.

Usually, an image signal is obtained at a field frequency of 60 Hz or more in order to prevent flicker in the image. Even if the frame frequency is changed to change the LAT in the entire area in which the FLC panel can be driven, the FLC panel needs to be driven at a field frequency of 60 Hz or more where no flicker occurs. In the case of a TV signal in the NTSC system, the LAT needs to be approximately 50 $\mu$s or less even at low temperature. FLC panels having such a short LAT mostly have a response time as short as 10 to 20 $\mu$s. According to the present invention, the frame frequency is changed while maintaining the field frequency at a fixed frequency of 60 Hz or more. Thus, such a problem does not occur.

An FLC panel including two polarizing plates usually have a light transmittance of 20 to 30%. When provided with a color filter, the light transmittance (light utilization ratio) reduces to approximately 10% or less. Such a low light transmittance requires use of a backlight. In the backlight, light is emitted using an AC waveform of approximately 10 to 40 kHz, and a beat occurs due to such a light emission frequency and the frame frequency, resulting in flicker. In order to avoid flicker, the light emission frequency of the backlight is set at a value which is not obtained by multiplying the frame frequency by an integer.

The frame frequency needs to be varied so that beat can be prevented. In the case where the frame frequency is changed by changing the ratio of interlace, beat does not occur.

In the case where the driving voltage level determination device is included, the constant memory angle can be maintained at a constant value. Thus, large capacity display with a sufficiently high contrast can be obtained.

Thus, the invention described herein makes possible the advantages of (1) providing an apparatus and a method for effectively driving an FLC panel including an FLC material having a negative dielectric anisotropy in a simple manner in a wider range of operation temperature, and (2) providing an apparatus and a method for driving an FLC panel while maintaining a memory angle at a constant angle to realize large capacity display with a sufficiently high contrast.

These and other advantages of the present invention will become apparent to those skilled in the art upon reading and understanding the following detailed description with reference to the accompanying figures.

BRIEF DESCRIPTION OF THE DRAWINGS

FIG. 13 is a view illustrating waveforms of signals obtained at various positions of the temperature compensation circuit shown in FIG. 12;

FIGS. 16A, 16B and 16C are charts illustrating the relationship between the frame frequency and the field frequency in various ratios of interlace.

DESCRIPTION OF THE PREFERRED EMBODIMENTS

Hereinafter, the present invention will be described by way of illustrative examples with reference to the accompanying drawings.

EXAMPLE 1

Figure 1:
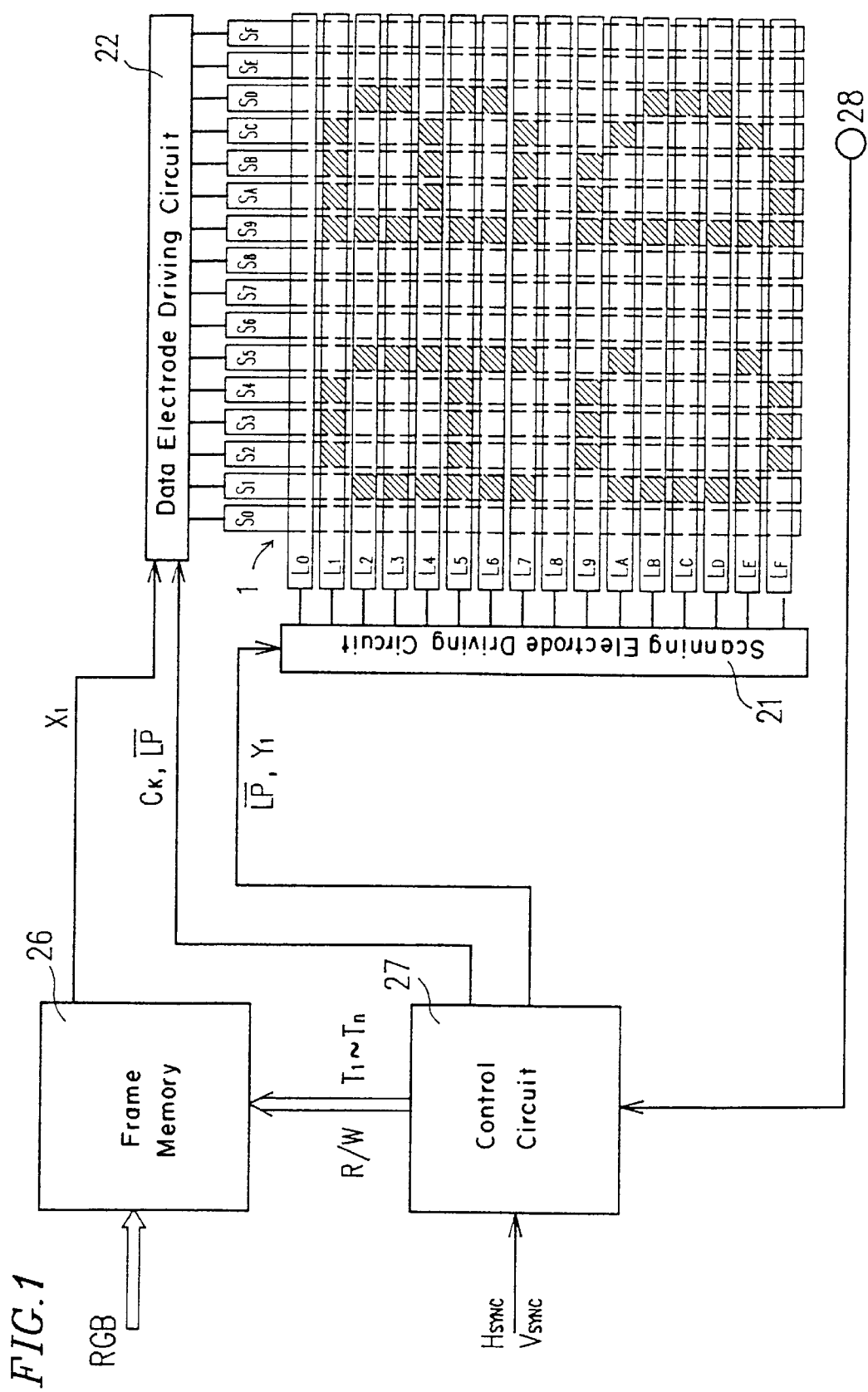
FIG. 1 is a plan view of an FLCD according to the present invention.
Figure 2:
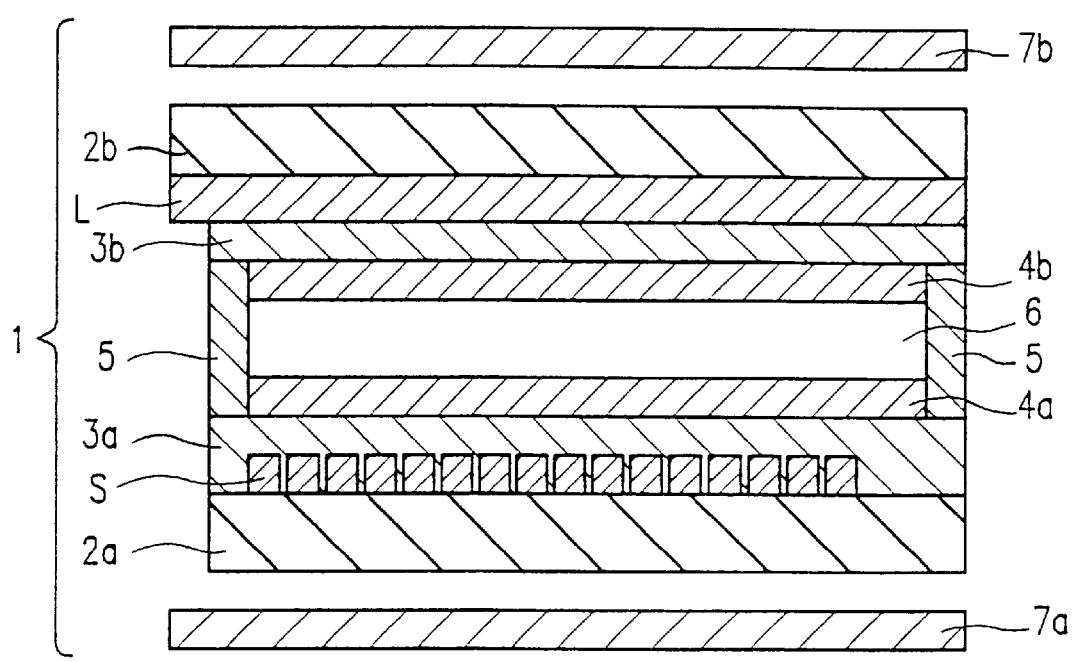
FIG. 2 is a cross sectional view of an FLC panel.
Figure 3A:
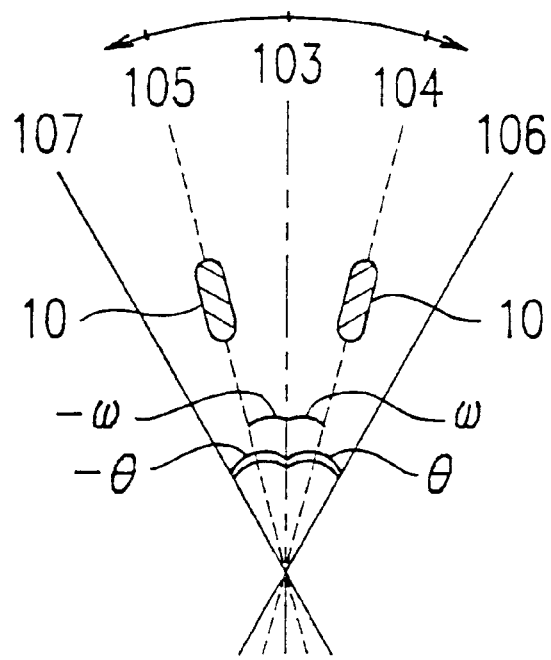
FIGS. 3A and 3B are views illustrating bistable orientation states of a liquid crystal molecule in a smectic C phase.
Figure 3B:
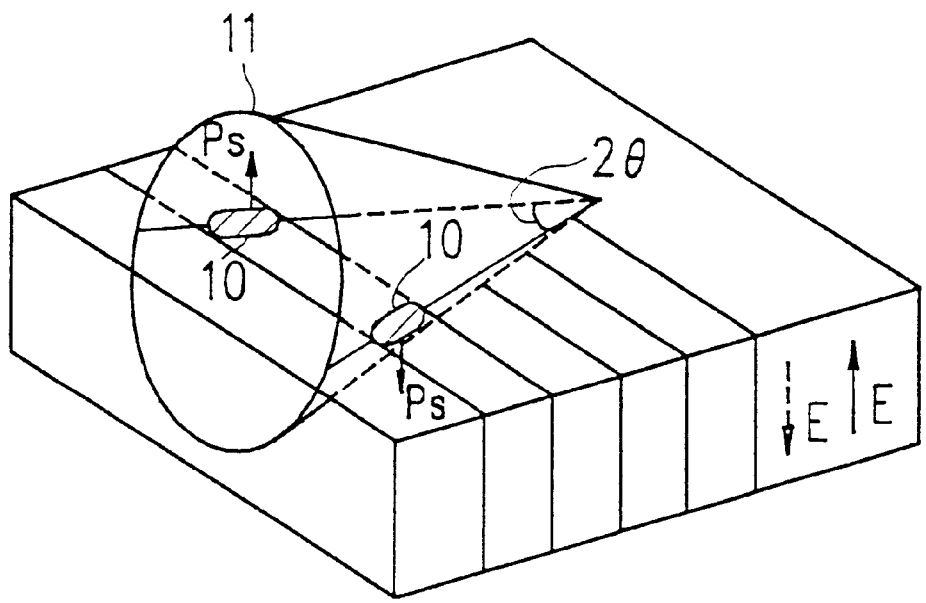
Figure 4:
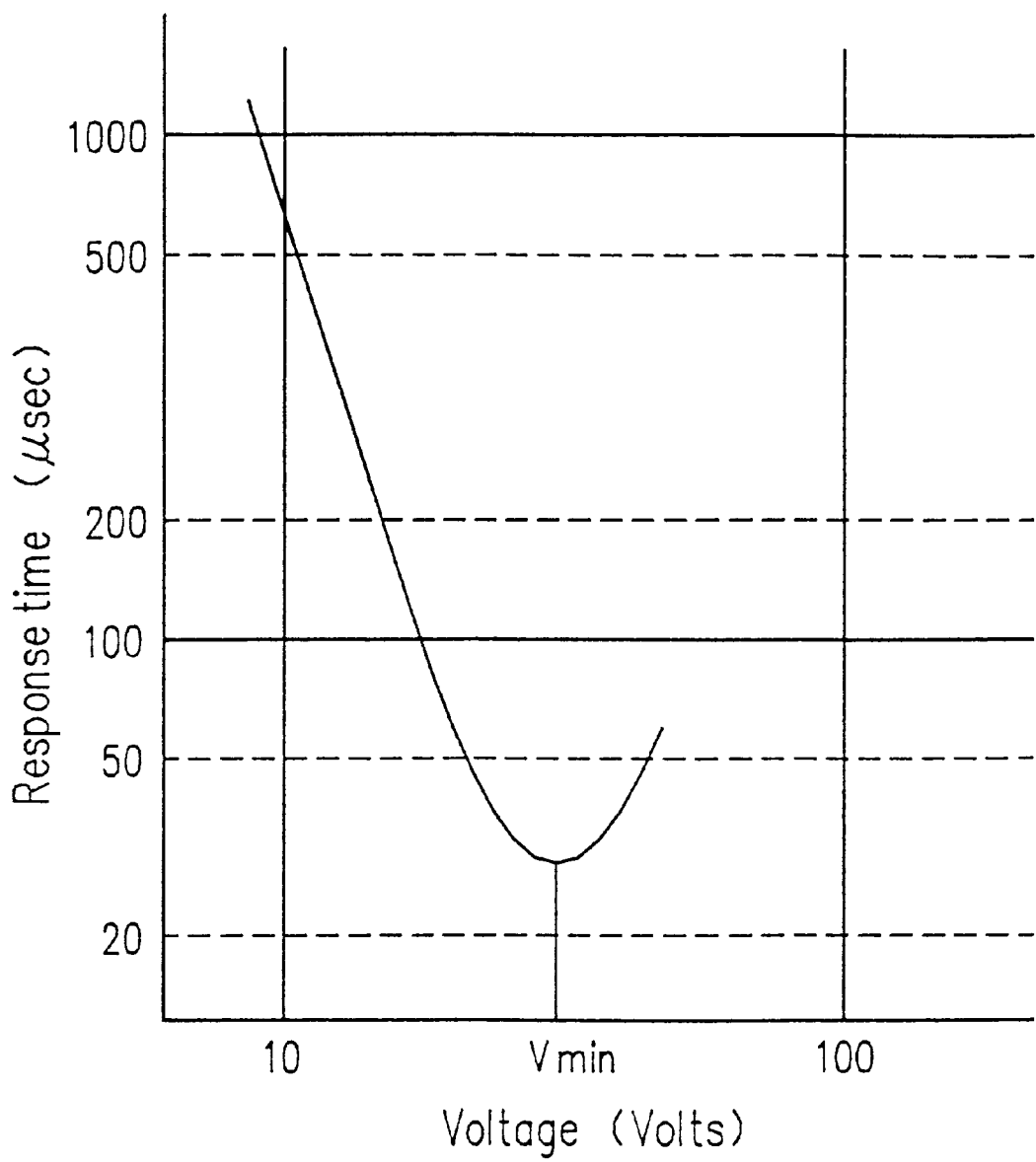
FIG. 4 is a graph illustrating the response time (memory pulse width) vs. voltage characteristic ($\tau$-Vmin characteristic) of an FLC material having a negative dielectric anisotropy.
Figure 5:
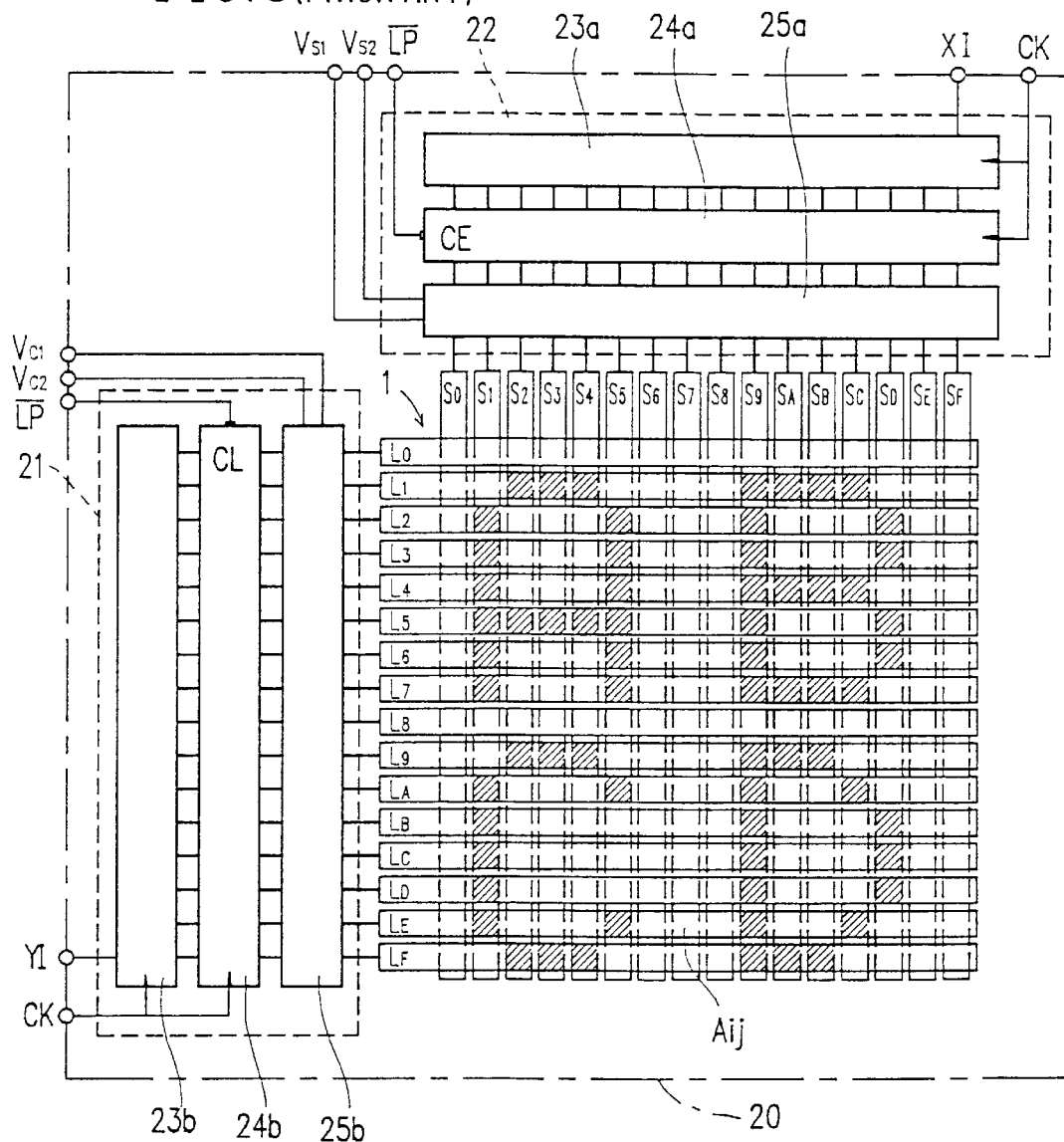
FIG. 5 is a plan view of a conventional FLCD.
Figure 6A:
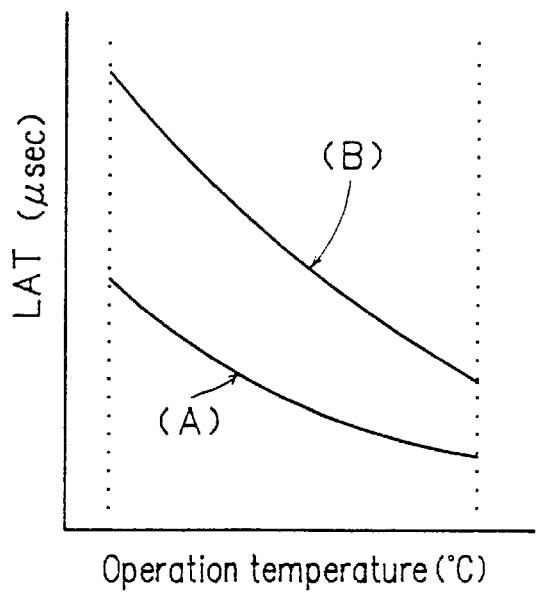
FIGS. 6A, 6C and 6D are graphs schematically illustrating the driving conditions of an FLC panel.
Figure 7:
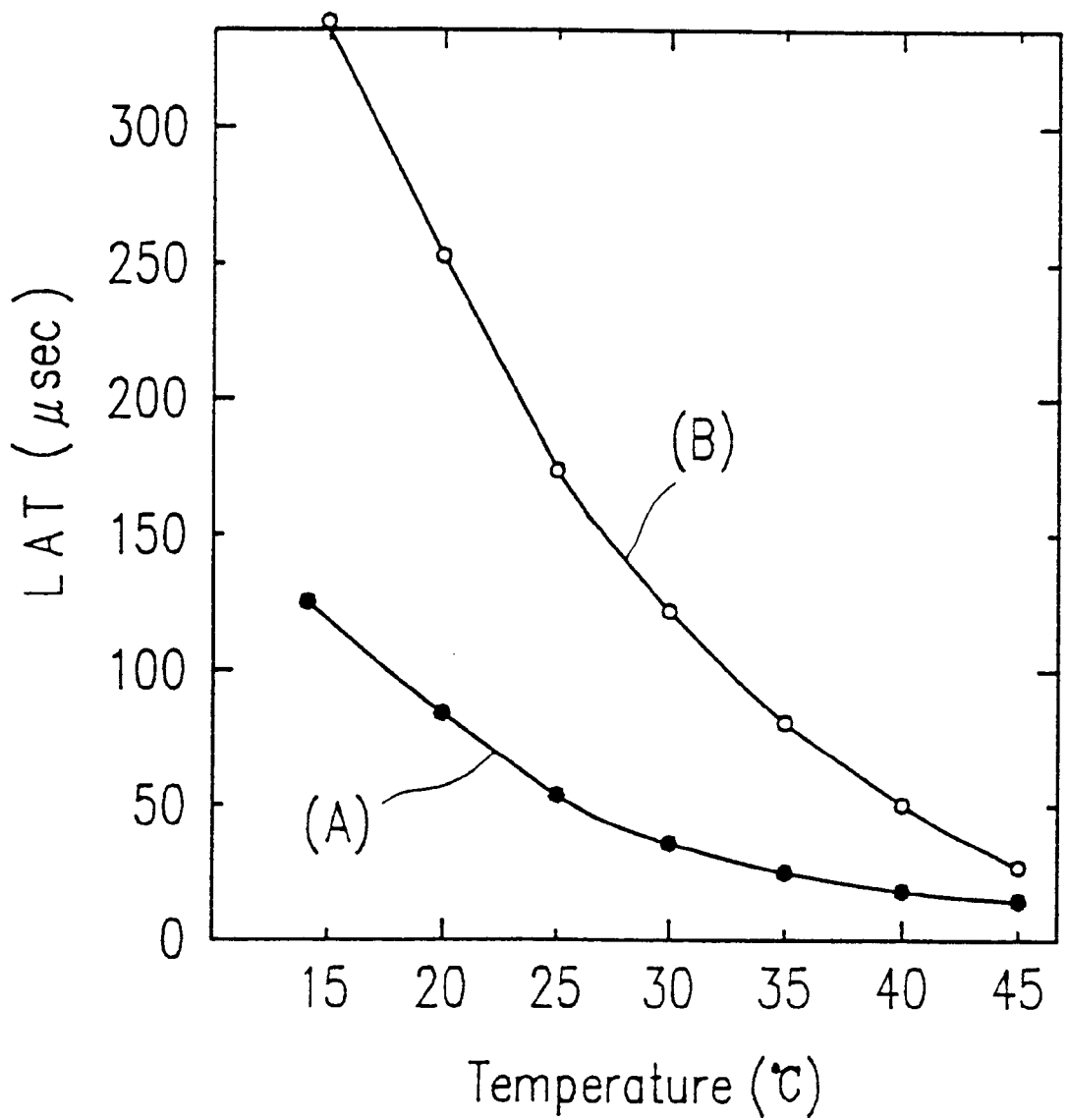
FIG. 7 is a graph illustrating the driving conditions of a conventional FLC panel.

FIG. 1 shows an FLCD in a first example according to the present invention. The FLCD includes the FLC panel 1 shown in FIG. 2. In an experiment, the FLCD was produced using the following materials for the alignment films 4a and 4b and the FLC material, and the FLCD was driven by the Malvaren III waveforms described in International Patent Publication No. WO92/02925 with reference to FIG. 5 in the above-mentioned publication. The results are shown in FIG. 7. Curves A and B in FIG. 7 correspond to curves (A) and (B) in FIG. 6A.

Alignment films: PSI-A-X007 (produced by Chisso Petrochemical Corporation)

FLC: SCE-8 (produced by Merck & Co., Inc.) 90 wt % and

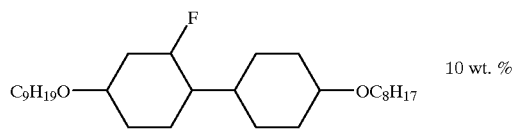

10 wt. %

Figure 8:
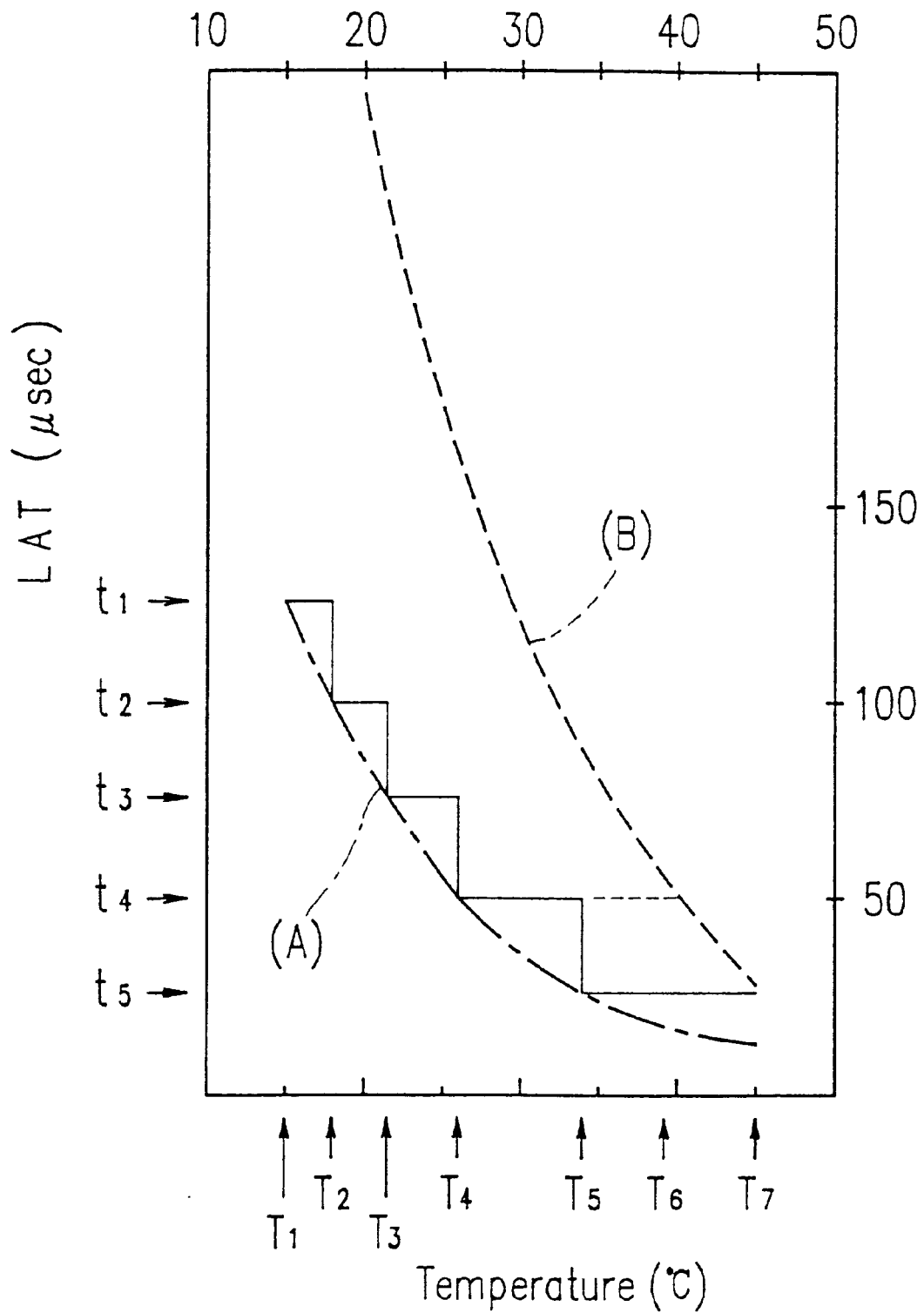
FIG. 8 is a graph illustrating the conditions for driving an FLC panel having the driving conditions shown in FIG. 7 by a method in a first example according to the present invention.

Based on the results shown in FIG. 7, the conditions for driving an FLC panel effectively for displaying a TV image signal of the NTSC system (number of scanning lines: 525) are shown in FIG. 8 and Table 1. In FIG. 8, the solid line corresponds to such conditions.

TABLE 1

| No. | Temperature range | Ratio of interlace | Field frequency | Frame frequency | LAT |
|---|---|---|---|---|---|
| I | 34.0° C.($T_5$)~ 45.0° C.($T_7$) | 1/1 | 60 (Hz) | 60 (Hz) | 25 $\mu s$ ($t_5$) |
| II | 26.0° C.($T_4$)~ 34.0° C.($T_5$) | 1/2 | 60 | 30 | 50 $\mu s$ ($t_4$) |
| III | 21.5° C.($T_3$)~ 26.0° C.($T_4$) | 1/3 | 60 | 20 | 75 $\mu s$ ($t_3$) |
| IV | 18.0° C.($T_2$)~ 21.5° C.($T_3$) | 1/4 | 60 | 15 | 100 $\mu s$ ($t_2$) |
| V | 15.0° C.($T_1$)~ 18.0° C.($T_2$) | 1/5 | 60 | 10 | 125 $\mu s$ ($t_1$) |

Where the field frequency=frame frequency=60 Hz and the number of scanning lines=525, the LAT of a liquid crystal panel other than the FLC panel is approximately 31.7 $\mu sec$. In the case of an FLCD, scanning needs to be performed twice for writing and erasing. Accordingly, in an experiment, data for four lines are simultaneously erased and then the same four lines are scanned progressively for data writing. After that, data for the next four lines are erased and then the same four lines are scanned progressively for data writing. In the case when scanning is performed in this manner, the LAT is found by the following equation.

$$10^6/(60 \times 525 \times 1.25) = 25 \, \mu s$$

The experiment of driving the FLC panel using the FLCD in FIG. 1 under the conditions shown in Table 1 generated satisfactory results.

As is illustrated in FIG. 1, the FLCD 1 includes a frame memory 26 for storing image display data. A driving control circuit 27 stores RGB image data which is sent real-time into the frame memory 26. The driving control circuit 27 determines an optimum ratio of interlace based on the temperature of the FLC panel sensed by a thermistor 28 used as a thermometer, and reads the image data from the frame memory 26 in accordance with the determined ratio of interlace.

A control signal R/W switches the frame memory 26 to a state where RGB image data is written into the frame memory 26 or to a state where the RGB image data is transferred from the frame memory 26 to a data electrode driving circuit 22 included in the FLCD. Signals T1 through Tn are address signals showing the address in the frame memory 26 in which such RGB data is stored.

FIGS. 16A, 16B and 16C illustrate the relationship between the frame frequency and the field frequency when the ratio of interlace is 1/1, 1/2 and 1/3, respectively.

In the FLCD in this example, the LAT changes pixel by pixel in accordance with the operation temperature. The field frequency is fixed at a predetermined reference frequency and the frame frequency changes in accordance with the operation temperature of the FLCD detected by the thermistor 28. The frame frequency is changed by changing the ratio of interlaced scanning of the FLCD.

Thus, an FLC panel which includes an FLC material having a negative dielectric anisotropy and thus has satisfactory characteristics as a display device such as a satisfactory image contrast and a sufficiently wide operation range can be driven by a simple and effective method in a simple and effective apparatus in a wide range of operation temperature.

A method for setting the optimum driving conditions shown in Table 1 will be described in general. Table 2 shows the order of writing image signals to the frame memory 26 and reading the image signals from the frame memory 26 at each ratio of interlace.

scanning, image data for line 0 is read three times successively in the processing of W0, R0, --, R0, W2, R0, -- R3.

TABLE 2

| | Ratio of interlace | Field | Order of writing to and reading from the frame memory |
|---|---|---|---|
| I | 1/1 | Odd field | $W_0, R_0, —, R_1, W_2, R_2, —, R_3, W_4, R_4, —, R_5, W_6, R_6, —, R_7 \ldots —, R_{523}, W_{524}, R_{524},$ |
| | | Even field | $—, R_0, W_1, R_1, —, R_2, W_3, R_3, —, R_4, W_5, R_5, —, R_6, W_7 R_7 \ldots W_{523}, R_{523}, —, R_{524},$ |
| II | 1/2 | Odd field | $W_0, R_0, —, R_0, W_2, R_2, —, R_2, W_4, R_4, —, R_4, W_6, R_6, —, R_6 \ldots —, R_{522}, W_{524}, R_{524},$ |
| | | Even field | $—, R_{524}, W_1, R_1, —, R_1, W_3, R_3, —, R_3, W_5, R_5, —, R_5, W_7 R_7 \ldots W_{523}, R_{523}, —, R_{523},$ |
| III | 1/3 | (6N-5) field | $W_0, R_0, —, R_0, W_2, R_0, —, R_3, W_4, R_3, —, R_3, W_6, R_6, —, R_6 \ldots —, R_{522}, W_{524}, R_{527},$ |
| | | (6N-4) field | $—, R^{***}, W_1, R_1, —, R_1, W_3, R_1, —, R_4, W_5, R_4, —, R_4, W_7 R_7 \ldots W_{523}, R_{523}, —, R_{523},$ |
| | | (6N-3) field | $W_0, R_{523}, —, R^{***}, W_2, R_2, —, R_2, W_4, R_2, —, R_5, W_6, R_5, —, R_5 \ldots —, R_{521}, W_{524}, R_{524},$ |
| | | (6N-2) field | $—, R_0, W_1, R_0, —, R_0, W_3, R_3, —, R_3, W_5, R_3, —, R_6, W_7 R_6 \ldots W_{523}, R_{522}, —, R_{522},$ |
| | | (6N-1) field | $W_0, R^{***}, —, R_1, W_2, R_1, —, R_1, W_4, R_4, —, R_4, W_6, R_4, —, R_7 \ldots —, R_{523}, W_{524}, R_{523},$ |
| | | (6N) field | $—, R_{523}, W_1, R^{***}, —, R_2, W_3, R_2, —, R_2, W_5, R_5, —, R_5, W_7 R_5 \ldots W_{523}, R_{521}, —, R_{524},$ |
| IV | 1/4 | (4N-3) field | $W_0, R_0, —, R_0, W_2, R_0, —, R_0, W_4, R_4, —, R_4, W_6, R_4, —, R_4 \ldots —, R_{520}, W_{524}, R_{524},$ |
| | | (4N-2) field | $—, R_{524}, W_1, R_{524}, —, R_{524}, W_3, R_3, —, R_3, W_5, R_3, —, R_3, W_7 R_7 \ldots W_{523}, R_{523}, —, R_{523},$ |
| | | (4N-1) field | $W_0, R_{523}, —, R_{523}, W_2, R_2, —, R_2, W_4, R_2, —, R_2, W_6, R_6, —, R_6 \ldots —, R_{522}, W_{524}, R_{522},$ |
| | | (4N) field | $—, R_{522}, W_1, R_1, —, R_1, W_3, R_1, —, R_1, W_5, R_5, —, R_5, W_7, R_5 \ldots —, R_{521},$ |
| V | 1/5 | (10N-9) field | $W_0, R_0, —, R_0, W_2, R_0, —, R_0, W_4, R_0, —, R_5, W_6, R_5, —, R_5 \ldots —, R_{520}, W_{524}, R_{520},$ |
| | | (10N-9) field | $—, R^{***}, W_1, R_1, —, R_1, W_3, R_1, —, R_1, W_5, R_1, —, R_6, W_7 R_6 \ldots W_{523}, R_{521}, —, R_{521},$ |
| | | (10N-9) field | $W_0, R_{521}, —, R^{***}, W_2, R_2, —, R_2, W_4, R_2, —, R_2, W_6, R_2, —, R_7 \ldots —, R_{522}, W_{524}, R_{522},$ |
| | | (10N-9) field | $—, R_{522}, W_1, R_{522}, —, R^{***}, W_3, R_3, —, R_3, W_5, R_3, —, R_3, W_7 R_3 \ldots W_{523}, R_{523}, —, R_{523},$ |
| | | (10N-9) field | $W_0, R_{523}, —, R_{523}, W_2, R_{523}, —, R^{***}, W_4, R_4, —, R_4, W_6, R_4, —, R_4 \ldots —, R_{519}, W_{524}, R_{524},$ |
| | | (10N-9) field | $—, R_0, W_1, R_0, —, R_0, W_3, R_0, —, R_0, W_5, R_5, —, R_5, W_7, R_5 \ldots W_{523}, R_{520}, —, R_{520},$ |
| | | (10N-9) field | $W_0, R^{***}, —, R_1, W_2, R_1, —, R_1, W_4, R_1, —, R_1, W_6, R_6, —, R_6 \ldots —, R_{521}, W_{524}, R_{521},$ |
| | | (10N-9) field | $—, R_{521}, W_1, R^{***}, —, R_2, W_3, R_2, —, R_2, W_5, R_2, —, R_2, W_7 R_7 \ldots W_{523}, R_{522}, —, R_{522},$ |
| | | (10N-9) field | $W_0, R_{522}, —, R_{522}, W_2, R^{***}, —, R_3, W_4, R_3, —, R_3, W_6, R_3, —, R_3 \ldots —, R_{523}, W_{524}, R_{523},$ |
| | | (10N) field | $—, R_{523}, W_1, R_{523}, —, R_{523}, W_3, R^{***}, —, R_4, W_5, R_4, —, R_4, W_7, R_4 \ldots W_{523}, R_{519}, —, R_{524},$ |

$W_N$: Writing data for line N
$R_N$: Reading data for line N

In Table 2, data corresponding to an odd-numbered field is processed in the following manner when the ratio of interlace is 1/1.

(1) W0: Image data for line 0 is stored in a prescribed address of the frame memory 26.

(2) R0: The image data for line 0 is read from the prescribed address in the frame memory 26.

(3) --: No image data is sent due to interlaced scanning, and thus no data is written.

(4) R1: Image data for line 1 is read from a prescribed address in the frame memory 26.

(5) W2: Image data for line 2 is stored in a prescribed address in the frame memory 26.

(6) R2: The image data for line 2 is read from the prescribed address in the frame memory 26.

Data processing is performed in the same order. When processing of data for the odd-numbered field is finished, the data for an even-numbered field is processed. When processing of data for the even-numbered field is finished, the data for the next odd-numbered field is processed.

In Table 2, letters $W_N$ denotes that data for line N corresponding to a TV image signal is written in the frame memory 26. In the case of an image signal of the NTSC system, the TV image signal is obtained by 1/2 interlaced scanning. Such a TV image signal is sent independently of the reading operation. Accordingly, the writing operation of the signal for the odd-numbered fields is different from the writing operation of the signal for the even-numbered fields, but the signals are stored in the frame memory 26 regardless of whether the signal is for the odd-numbered fields or the even-numbered fields in the case when the signals are obtained by a certain ratio of interlace.

Letters $R_N$ denotes that image data for line N stored at a prescribed address in the frame memory 26 is read. For example, in reading data for field (6N-5) by 1/3 interlaced In this manner, the LAT is permitted to extend to three times when compared with the LAT in the case when the ratio of interface is 1/1.

In order to compare the method in this example and the conventional method, the following experiment was conducted. For the conventional method, condition II in Table 1 was used. Namely, the field frequency was fixed at 60 Hz and the frame frequency was fixed to 30 Hz while the temperature was changed. In the range between 26° C. (T4) to 39.5° C. (T6), satisfactory display was performed; but outside such a range, writing was not performed or data was written in a pixel in which no data was to be written. As a result, an image having a normal contrast was not displayed.

As is appreciated from the results of the above experiment, satisfactory contrast is obtained only in the range between 26° C. (T4) to 39.5° C. (T6) by the conventional method. According to the present invention, satisfactory contrast with no flicker is obtained in the temperature range of 15° C. (T1) and 45° C. (T7). Such a range of 30 degrees is twice or more when compared with the conventional method.

In this example, an image signal which is obtained by interlaced scanning performed at a prescribed ratio of the frame frequency and the field frequency is first stored in the frame memory. Only the frame frequency is changed in accordance with the temperature while the field frequency is maintained the same. The field frequency is maintained in order to prevent flicker. In this manner, a LAT can be extended to a period which is sufficiently long for reading of image data even at low temperature. Thus, satisfactory display is performed. According to the present invention, an apparatus and a method for driving an FLC panel realizing large capacity display having a satisfactory contrast with no flicker in a temperature range which is twice or more than that in the case of the conventional system are obtained.

EXAMPLE 2

In a second example and a third example according to the present invention, the driving voltage is changed in accordance with the temperature. Thus, a memory angle is maintained at a constant angle in an area between curve A and curve B in FIGS. 14A and 14B in which the FLC panel can be driven effectively. Curves A and B correspond to curves A and B in FIG. 15 (infra). Thus, an image having a sufficiently high contrast is displayed.

Figure 14A:
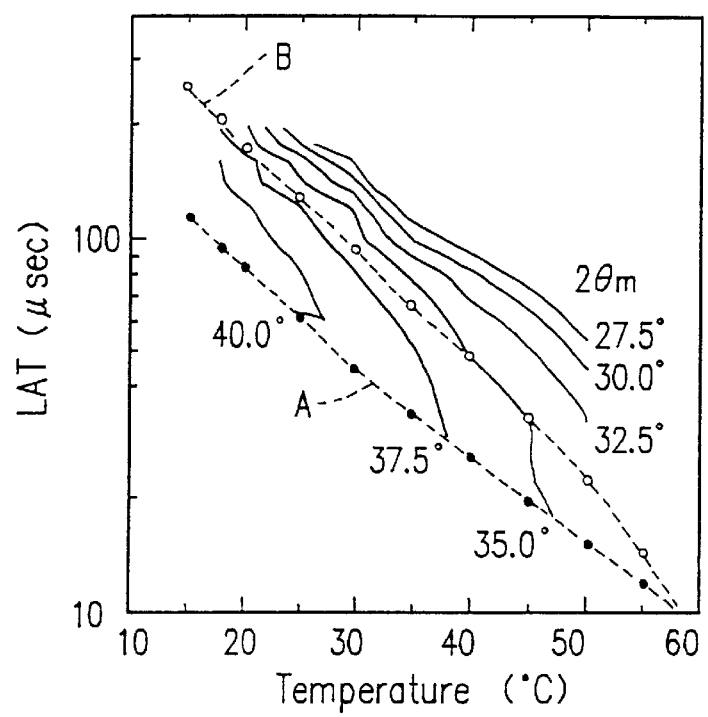
FIGS. 14A and 14B are graphs illustrating the driving conditions for various memory angles obtained by different driving voltages (Vd)
Figure 14B:
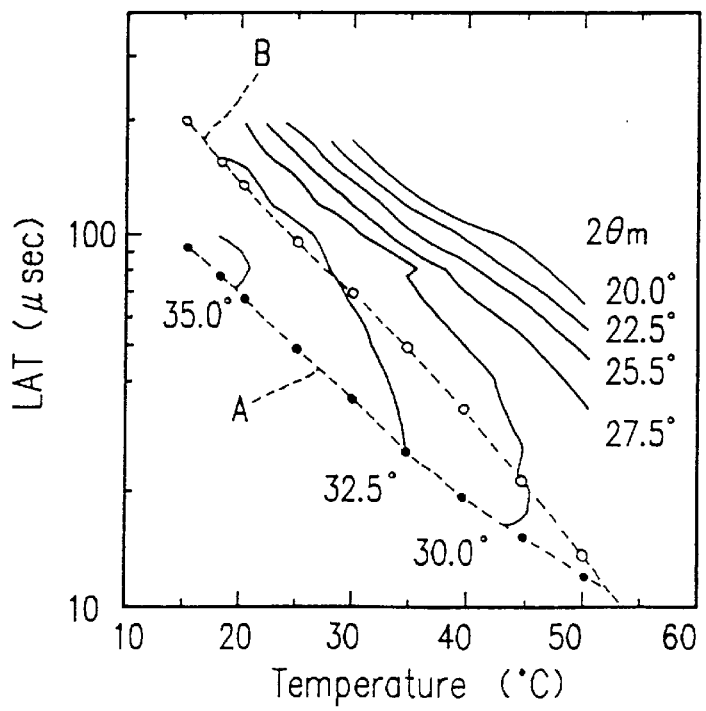

The inventors of the present invention studied the relationship between the driving voltage and the memory angle, and found the following:

(1) The memory angle is significantly changed by the voltage (Vd) of the data line as is shown by curves A and B in FIGS. 14A and 14B.

(2) From FIGS. 14A and 14B, it is assumed that the memory angle can be maintained at, for example, $2\theta m=35.0°$ by changing the driving voltage Vd in the range between 7.5 V and 10 V (FIG. 15) when the operation temperature of the FLC panel is between 20° C. and 45° C.

Figure 6B:
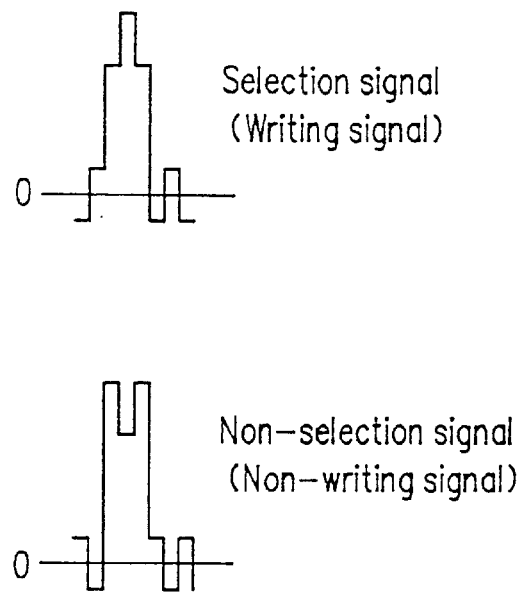
FIG. 6B is a view illustrating Malvaren III waveforms.
Figure 6C:
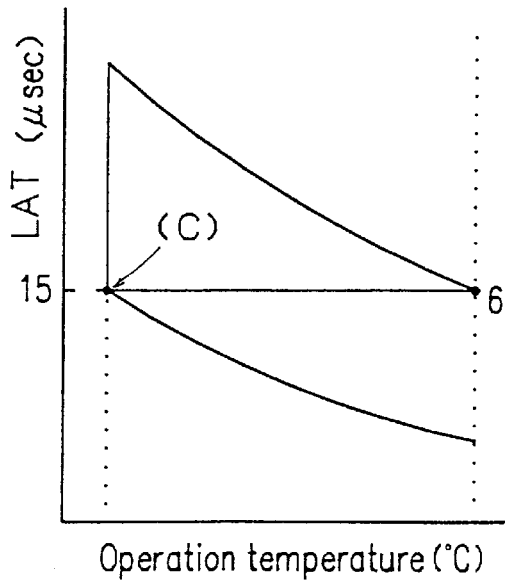
Figure 6D:
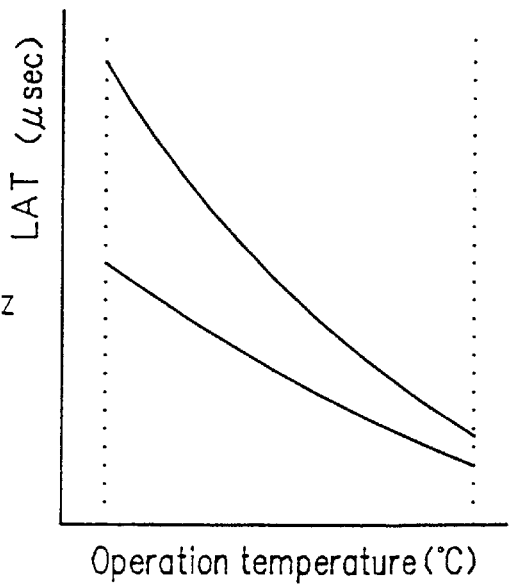

An experiment was performed to find whether or not a minimum LAT which is required to cause 100% inversion of the liquid crystal molecules can be found at each operation temperature by applying a writing signal (selection signal) having the Marvaren III waveform (FIG. 6B). The driving voltage Vd was appropriately changed in accordance with the temperature, and thus the memory angle could be fixed at 35.0°. In this example, the FLC panel of the first example is used.

Figure 15:
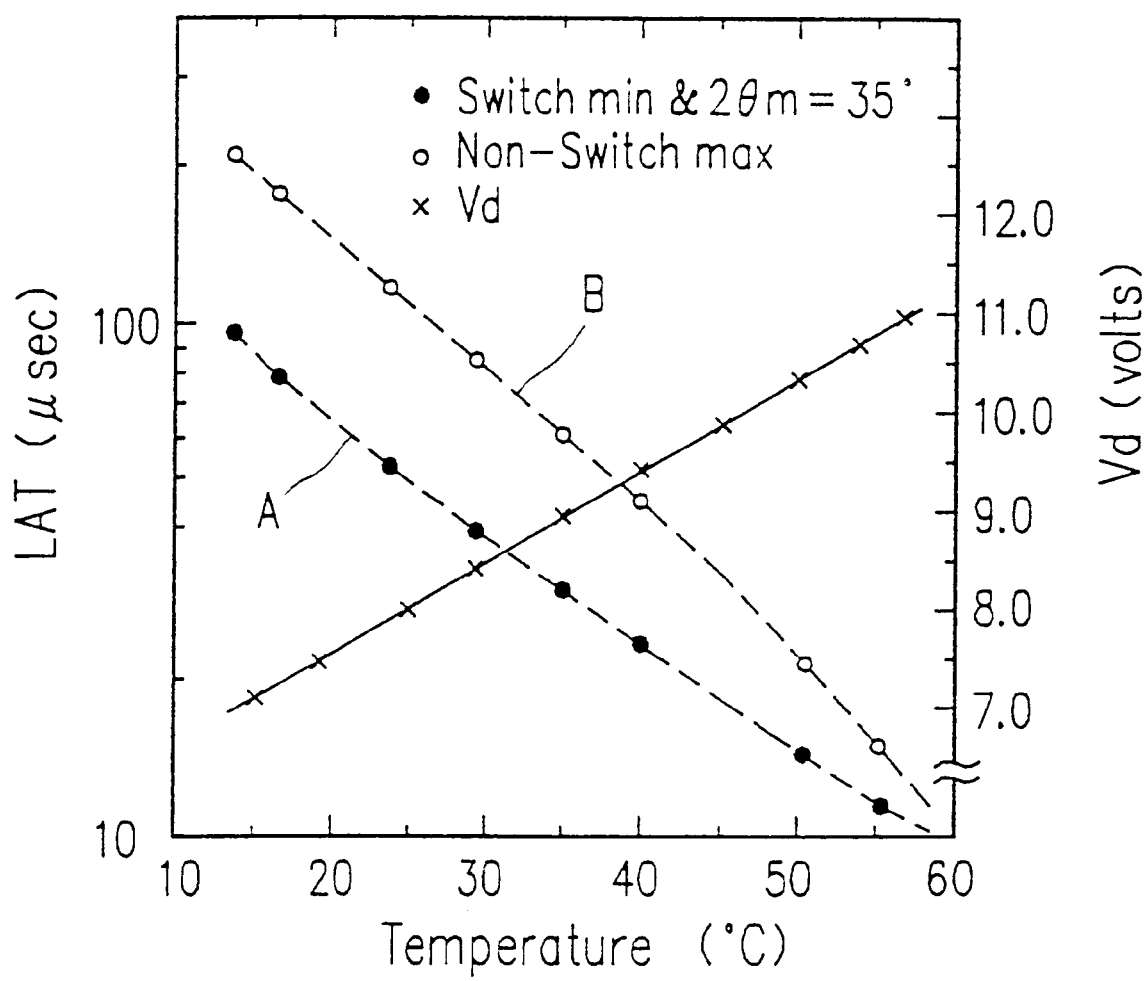
FIG. 15 is a graph illustrating the conditions for driving an FLC panel by a method in the second example.

FIG. 15 shows the results. As is appreciated from FIG. 15, the driving conditions to maintain the memory angle at a constant angle can be found even if the temperature changes. Thus, an image having a sufficiently high contrast can be displayed even if the temperature changes.

Figure 9:
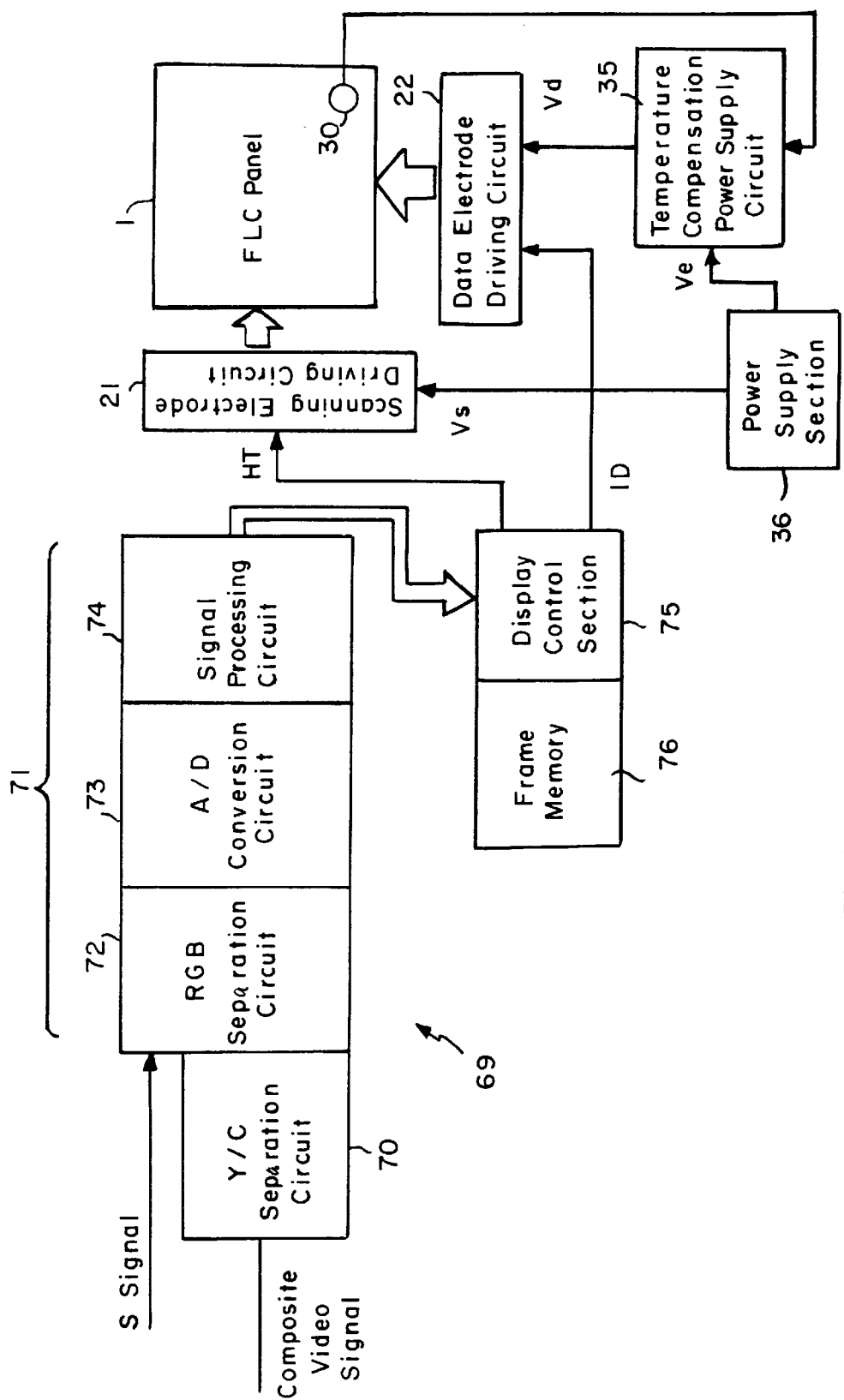
FIG. 9 is a block diagram of an FLCD in a second example according to the present invention.
Figure 10:
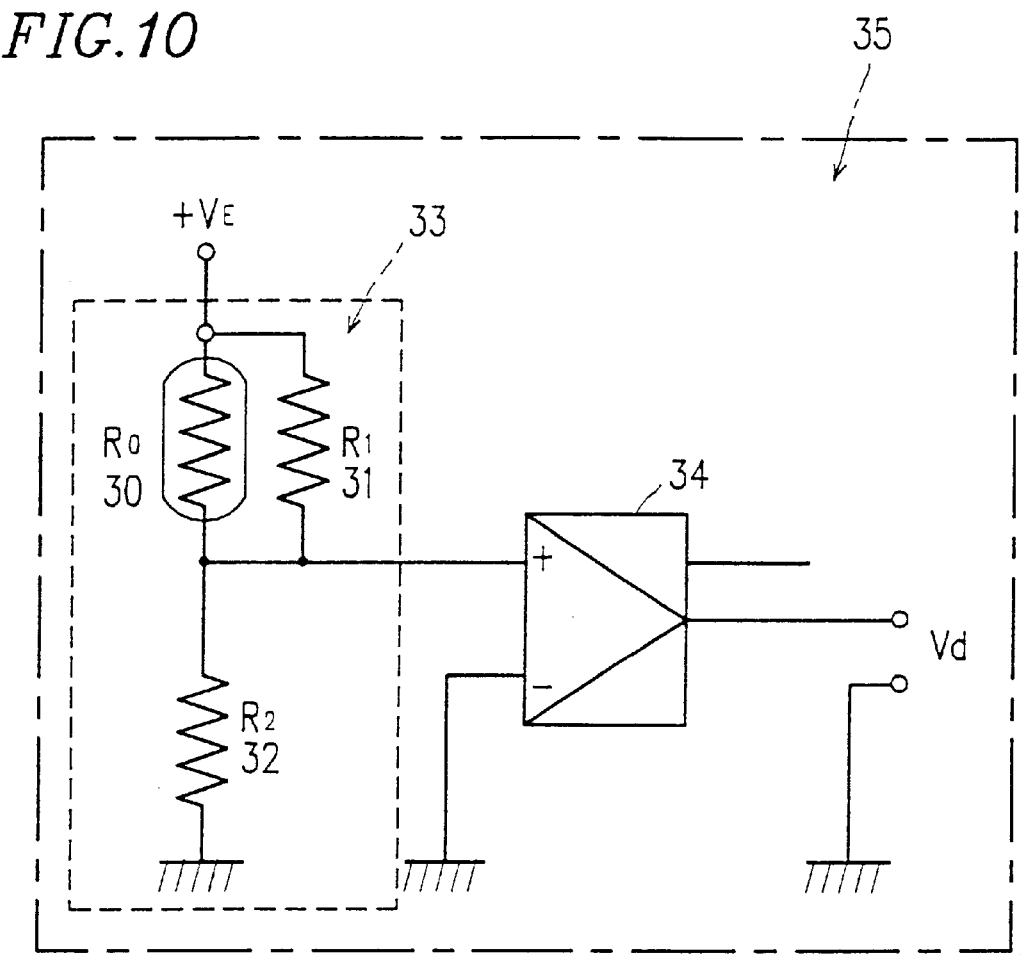
FIG. 10 is a detailed block diagram of a temperature compensation circuit shown in FIG. 9.

FIG. 9 is a block diagram of an FLCD in the second example. The FLCD includes the FLC panel 1 and a driving apparatus for the FLC panel 1. FIG. 10 is a detailed block diagram of a temperature compensation power supply circuit 35 included in the driving apparatus shown in FIG. 9.

As is shown in FIG. 9, the driving apparatus includes a scanning electrode driving circuit 21 for supplying a voltage to each of a plurality of scanning electrodes Li and a data electrode driving circuit 22 for supplying a voltage to each of a plurality of signal electrodes Sj. A driving voltage corresponding to the potential difference between the voltage supplied to one of the scanning electrode Li and the voltage supplied to one of the signal electrodes Sj is applied to the pixel Aij which is the intersection thereof. Thus, the display of the pixel Aij is turned "ON" or "OFF". The data electrode driving circuit 22 includes a holding circuit (not shown in FIG. 9) for holding the data for a certain time period in accordance with the latch pulse signal (LP), and a voltage generation circuit (not shown in FIG. 9) for generating a voltage in accordance with the data.

The driving apparatus further includes a display control section 69 for controlling the scanning electrode driving circuit 21 and the data electrode driving circuit 22 to display a desirable image in the FLC panel 1. The display control section 69 includes an Y/C separation circuit 70 for dividing a composite video signal into a luminance signal and a chrominance signal, and an image signal control section 71 for receiving the luminance signal and the chrominance signal. The image signal control section 71 includes an RGB separation circuit 72 for receiving an S signal and the chrominance signal and separating a Csync signal from the chrominance signal, an A/D conversion circuit 73, and a signal processing circuit 74.

The data corresponding to each frame which is sent from the image signal control section 71 is stored in a frame memory 76, and is processed by the display control section 75. The resultant signal is input to the scanning electrode driving circuit 21 and also to the data electrode driving circuit 22.

The driving apparatus also includes a temperature sensor 30 for sensing the operation temperature of the FLC panel 1. The temperature sensor 30 is formed of a thermistor or the like. An output from the temperature sensor 30 is sent to a temperature compensation power supply circuit 35. The temperature compensation power supply circuit 35 adjusts a voltage supplied from a power supply section 36 as described later based on the operation temperature of the FLC panel 1 detected by the temperature sensor 30, and then supplies a driving voltage Vd to the data electrode driving circuit 22. The power supply section 36 supplies driving voltages $V_S$ and $V_\epsilon$. respectively to the scanning electrode driving circuit 21 and the temperature compensation power supply circuit 35.

Referring to FIG. 10, the temperature sensor 30, fixed resistors 31 and 32 form a compensation reference voltage generation circuit 33. A reference voltage generated by the compensation reference voltage generation circuit 33 to be used for compensation is amplified in terms of the current by a buffer circuit 34 formed of an operational amplifier, and a prescribed driving voltage Vd is used as the power supply for the data electrode driving circuit 22. In the temperature compensation power supply circuit 35 having the above-described structure, such a driving voltage needed to maintain the memory angle at a constant angle even if the operation temperature of the FLC panel 1 changes can be supplied by the data electrode driving circuit 22 to each of the plurality of signal electrodes Sj.

In this example, the driving conditions for maintaining the memory angle at a constant angle can be obtained by provision of the temperature compensation power supply circuit 35. As a result, large capacity display with a sufficiently high contrast can be realized in a wider range of operation temperature.

EXAMPLE 3

The driving apparatus shown in FIG. 9, which has a simple configuration, is suitable for driving a plurality of FLC panels having no or little difference in the characteristics. In most of FLCDs produced today, the difference in the characteristics among a plurality of FLC panels is too large to be ignored. Under such circumstances, the temperature gradient and the absolute value of the driving voltage need to be changed to be suitable to each FLC panel.

Figure 11:
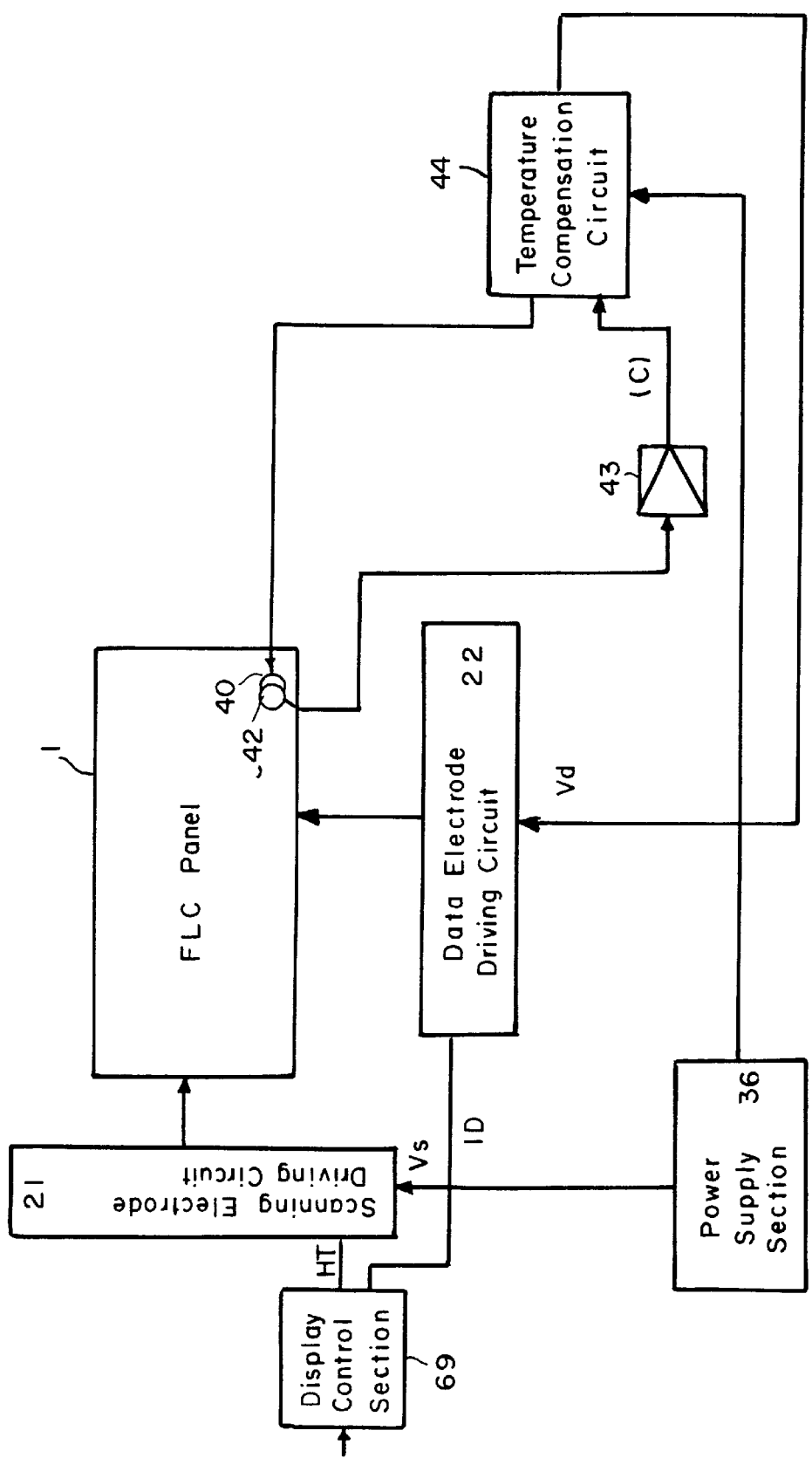
FIG. 11 is a block diagram of an FLCD in a third example according to the present invention.
Figure 12:
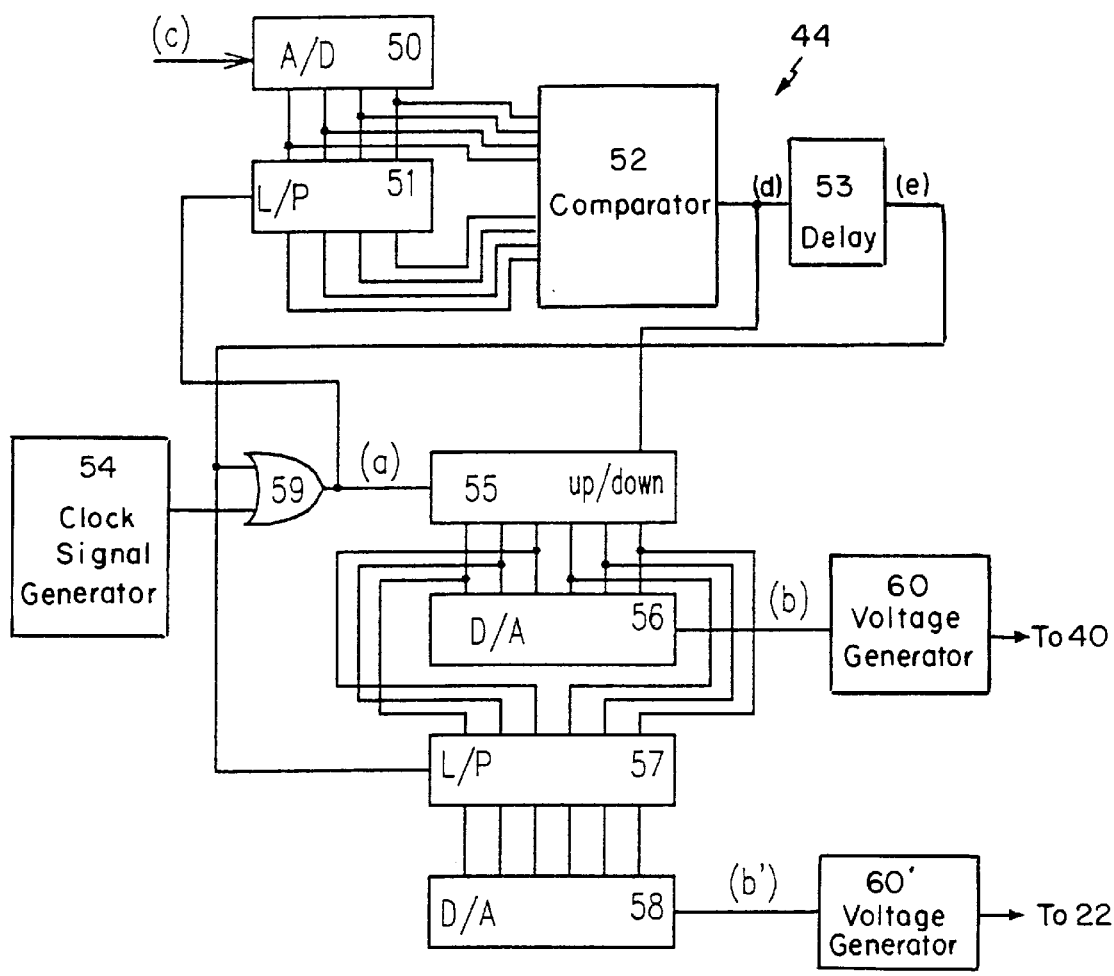
FIG. 12 is a detailed block diagram of a temperature compensation circuit shown in FIG. 11.

A driving apparatus in the third example includes a temperature compensation circuit which is effective in such a case. FIG. 11 is a block diagram of an FLCD including such a temperature compensation circuit 44. FIG. 12 is a detailed block diagram of the temperature compensation circuit 44. FIG. 13 shows waveforms of signals at positions (a) through (e) in FIG. 12. The waveforms are provided for better understanding of the function of each part of the driving apparatus. The FLCD in this example includes FLC panels 1 which are of a transmission type provided with a backlight. The FLCD in the third example has a similar electric configuration to the FLCD in the second example, and the elements corresponding to those in the second example bear the same reference numerals.

As is shown in FIG. 11, the driving apparatus includes a compensation voltage sensing electrode 40 provided in the vicinity of a display area of the FLC panel 1.

With reference to FIG. 12, a clock is generated by a clock signal generator 54 in the temperature compensation circuit 44 and input to an UP/DOWN counter 55 via an OR gate 59. The output from the UP/DOWN counter 55 is input to a D/A converter 56. Thus, a voltage having waveform (b) in FIG. 13 is generated. The voltage having waveform (b) changes in a step-like manner and is provided to determine the level of the driving voltage Vd of the data line. Then, a voltage for driving the FLC panel 1 having a prescribed waveform is generated by a voltage generator 60 and is applied to the compensation voltage sensing electrode 40.

The driving apparatus also includes a light receiving sensor 42 such as a photodiode or a phototransistor in the vicinity of a display area of each FLC panel 1. The light receiving sensor 42 is provided for sensing the intensity of light from the backlight received by the compensation voltage sensing electrode 40. Due to the receiving sensor 42, the light transmittance of the FLC panel 1 when being supplied with the driving voltage generated by the voltage generator 60 is sensed.

By changing the driving voltage as is shown in waveform (b) in FIG. 13, the temperature compensation circuit 44 can find a driving voltage which is optimum when the intensity of the light transmitted through the FLC panel 1 is minimum. Such a driving voltage has waveform (c) shown in FIG. 13.

Returning to FIG. 12, a method for finding the position of the optimum driving voltage changing in the step-like manner (waveform (c)) will be described. An output from the light receiving sensor 42 is sent to an A/D converter 50 via a buffer amplifier and converted into a digital signal. The digital signal is input to a latch circuit 51. Then, the digital signal is input to a comparator 52, which compares the digital signal output from the latch circuit 52 (Vout) and the digital signal directly sent from the A/D circuit 50 (same as the digital signal input to the latch circuit 51 (Vin). When Vin<Vout, the clock from the clock signal generator 54 is sent to the UP/DOWN counter 55 to raise the driving voltage Vd. Each time the driving voltage Vd is increased by a prescribed level, the comparator 52 compares Vin and Vout. When the intensity of light transmitted through the FLC panel 1 is reduced to the minimum and then starts increasing again, Vin and Vout obtains the relationship of Vin>Vout. Then, the comparator 52 outputs a signal having waveform (d) in FIG. 13.

However, the optimum driving voltage is at one step before in waveform (c). In order to delay the signal having waveform (d) by one clock, a necessary clock is formed of a delay circuit 53 and an AND gate 59. In order to invert the direction of counting performed by the UP/DOWN counter 55 at the end of the above-mentioned one clock, the signal having waveform (d) is input to the UP/DOWN counter 55.

A latch circuit 57 and a D/A converter 58 are included in the temperature compensation circuit 44 for maintaining the previous optimum driving voltage even while an optimum driving voltage is found by the circuits 50 through 56. The output (b') from the D/A converter 58 is used for forming the driving voltage Vd of the data line.

The driving apparatus in this example is suitable for driving a plurality of FLC panels 1 having different characteristics which cannot be ignored. It is not necessary to change the temperature gradient and the absolute value of the driving voltage to be suitable to each FLC panel 1.

In the third example, the memory angle can be maintained at a constant angle even if the temperature changes, due to the provision of the temperature compensation circuit, without the necessity of physically changing the angle of the polarizing plates. As a result, large capacity display with a sufficiently high contrast can be realized in a wider range of operation temperature.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for driving a ferroelectric liquid crystal panel including a plurality of scanning electrodes, a plurality of signal electrodes crossing the scanning electrodes, a ferroelectric liquid crystal material having two stable orientation states corresponding to different memory angles and provided at intersections of the plurality of scanning electrodes and the plurality of signal electrodes to form a plurality of pixels, the plurality of pixels each having a first threshold characteristic regarding a voltage for switching a display state of the pixel into a non-display state and a second threshold characteristic regarding a voltage for switching the non-display state of the pixel into the display state, the apparatus comprising:

driving voltage level determination means in which a level of a driving voltage applied to the plurality of signal electrodes is increased or decreased so as to maintain a memory angle at substantially a constant value by compensating for a decrease or an increase of the memory angle in accordance with an increase or decrease of an operation temperature of the ferroelectric liquid crystal panel, respectively; and pixel driving means for outputting the driving voltage having the level determined by the driving voltage level determination means to each of the plurality of signal electrodes.

2. An apparatus according to claim 1, wherein the driving voltage level determination means includes temperature detection means for detecting the operation temperature of the ferroelectric liquid crystal panel.

3. An apparatus according to claim 1, wherein the driving voltage level determination means includes temperature compensation driving voltage detection means provided in the ferroelectric liquid crystal panel for detecting a light transmittance of the ferroelectric liquid crystal panel which corresponds to a temperature compensation driving voltage applied to the ferroelectric liquid crystal panel.

4. A method for driving a ferroelectric liquid crystal panel including a plurality of scanning electrodes, a plurality of signal electrodes crossing the scanning electrodes, a ferroelectric liquid crystal material having two stable orientation states corresponding to different memory angles and provided at intersections of the plurality of scanning electrodes and the plurality of signal electrodes to form a plurality of pixels, the plurality of pixels each having a first threshold characteristic regarding a voltage for switching a display state of the pixel into a non-display state and a second threshold characteristic regarding a voltage for switching the non-display state of the pixel into the display state, the method comprising the steps of:

determining a level of a driving voltage such that the level of the driving voltage applied to the plurality of signal electrodes is increased or decreased so as to maintain a memory angle at substantially a constant value by compensating for a decrease or an increase of the memory angle in accordance with an increase or decrease of an operation temperature of the ferroelectric liquid crystal panel, respectively; and outputting the resulting driving voltage level to each of the plurality of signal electrodes.

5. A method according to claim 4, wherein the step of determining the driving voltage level includes the step of measuring the operation temperature of the ferroelectric liquid crystal panel.

6. A method according to claim 4, wherein the step of detecting a light transmittance of the ferroelectric liquid crystal panel which corresponds to a temperature compensation driving voltage applied to the ferroelectric liquid crystal panel.

* * * * *